United States Patent [19]
Baldwin et al.

[11] 3,913,987
[45] Oct. 21, 1975

[54] TRACK TYPE TRACTORS HAVING RESILIENTLY MOUNTED TRACK ROLLER ASSEMBLIES

[75] Inventors: Arden E. Baldwin, East Peoria; Harold W. Carlson, Peoria; Bruce W. Miers, Peoria Heights, all of Ill.

[73] Assignee: Caterpillar Tractor Co., Peoria, Ill.

[22] Filed: Feb. 21, 1974

[21] Appl. No.: 444,315

[52] U.S. Cl. ................................ 305/27; 305/57
[51] Int. Cl.² ........................................ B62M 27/00
[58] Field of Search ............ 305/25, 27, 21, 23, 24, 305/26, 41, 98, 47, 49, 57

[56] References Cited
UNITED STATES PATENTS
| | | | |
|---|---|---|---|
| 3,336,087 | 8/1967 | Reinsma | 305/27 |
| 3,695,737 | 10/1972 | Alexander | 305/27 |

*Primary Examiner*—Philip Goodman
*Attorney, Agent, or Firm*—Ralph E. Walters

[57] ABSTRACT

An improved truck for track type tractors having resiliently mounted track roller assemblies. The truck includes an elongated frame journalling sprockets at opposite ends about which an endless track is trained. A plurality of track roller assemblies engage the lower run of the track and are resiliently secured to the frame to cushion vertical movement of the track roller assemblies. A linkage system or, in the alternative, a cable system, interconnects the track roller assemblies and the frame to restrain the track roller assemblies against longitudinal shifting relative to the frame. Depending side members secured to the frame are in sliding contact with opposite ends of each track roller assembly to restrain the same against side-to-side shifting movement.

9 Claims, 4 Drawing Figures

U.S. Patent    Oct. 21, 1975    3,913,987
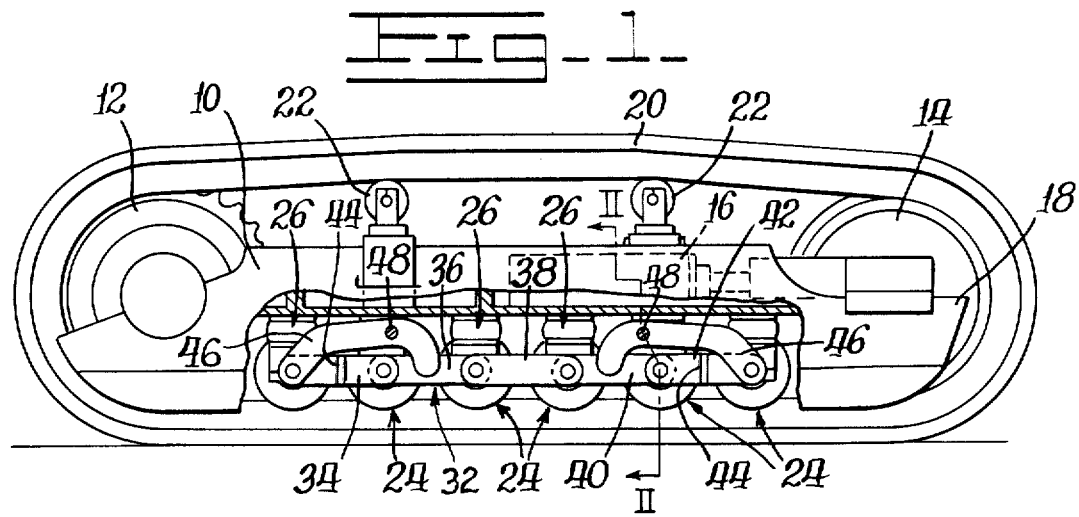
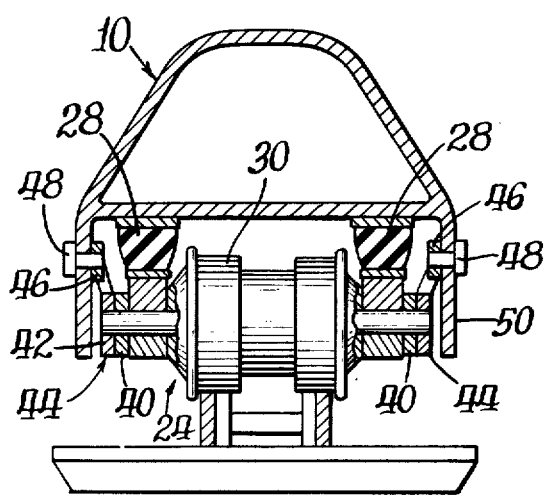
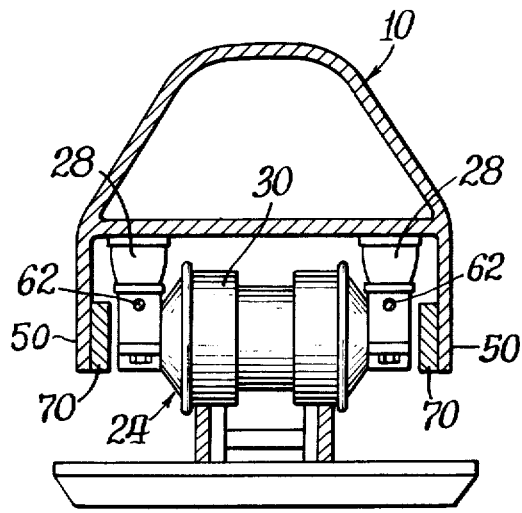
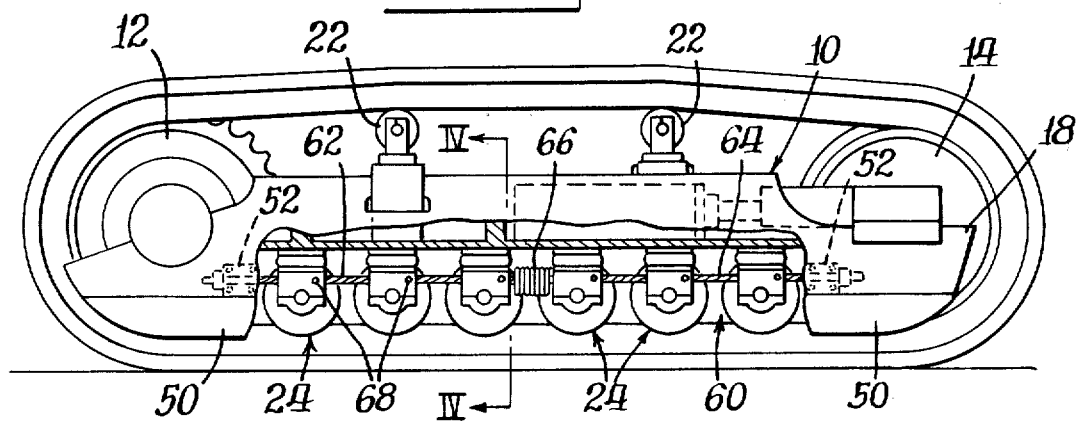

TRACK TYPE TRACTORS HAVING RESILIENTLY MOUNTED TRACK ROLLER ASSEMBLIES

BACKGROUND OF THE INVENTION

This invention relates to trucks for track type tractors and, more specifically, to such trucks wherein track roller assemblies are resiliently secured to a truck frame.

Relevant prior art includes U.S. Pat. Nos. 1,017,443 to Montsabre; 1,258,605 to Norelius et al; 1,282,327 to Turnbull; 1,512,152 to White; 3,336,087 to Reinsma; and 3,695,737 to Alexander et al.

Over the years, many efforts have been expended in attempts to develop suspension for tracks employed in track type tractors or the like which are long-lived. In some instances, the approach has been one of employing resilient suspensions for track roller assemblies engaging the lower run of an endless track, while in other cases, the approach has centered on the use of tracks formed of rubber-like components.

The latter approach has not proven altogether satisfactory since, typically, the rubber-like belts, even when cable-reinforced, tend to stretch excessively when placed under high loads. The former approach employing resilient suspensions has proved to be quite satisfactory in use, but frequently is relatively expensive from the manufacturing standpoint, particularly when plural compression pads or springs are employed at each end of a track roller assembly.

Thus, there is a need for a resilient suspension system in trucks for track type tractors which is economical to manufacture and yet has long life.

SUMMARY OF THE INVENTION

It is the principal object of the invention to provide a new and improved truck for track type tractors. More specifically, it is an object to provide such a truck that is inexpensive to fabricate and which will have a long life.

The exemplary embodiment of the invention achieves the foregoing objects in a construction including an elongated truck frame journalling track sprockets at each end thereof. An endless track is trained about the sprockets and a plurality of track roller assemblies engage the upper surface of the lower run of the track at longitudinally spaced points between the sprockets. A plurality of resilient means, such as springs or compression pads, are provided in a number double the number of track roller assemblies and interconnect an associated track roller assembly and the frame for cushioning movement of the track roller assembly in a vertical direction. Means are also provided for interconnecting the track roller assemblies and the frame for restraining the track roller assemblies against longitudinal movement relative to the frame while allowing movement of the track roller assemblies in the vertical direction.

According to one embodiment of the invention, the restraining means are defined by a plurality of individual links pivotally connected to each other and to the track roller assemblies. In a highly preferred embodiment, at least one of the links is a bell crank having one end connected to another link by a pivot and its opposite end disposed in side-by-side relation with another of the links so as to restrain such links against side-to-side movement to thereby apply a restraining force to the track roller assemblies against side-to-side movement.

In another embodiment of the invention, the restraining means comprise a cable which is attached to the frame and to the track roller assemblies. The cable may be defined by two cable sections secured to each other at adjacent ends by resilient means such as a spring and at opposite ends to the truck frame. Intermediate their ends, the cables are secured to the track roller assemblies.

The invention also contemplates that the truck frame be provided with depending side members extending downwardly into side-by-side relation with the track roller assemblies to provide further restraint of the same against side-to-side movement.

Other objects and advantages will become apparent from the following specification taken in conjunction with the accompanying drawings.

DESCRIPTION OF THE DRAWINGS

FIG. 1 is a side elevation of a truck made according to the invention with portions broken away to illustrate a linkage system;

FIG. 2 is a vertical section taken approximately along the line 2—2 of FIG. 1;

FIG. 3 is a side elevation of a further embodiment of the invention with parts broken away; and FIG. 4 is a vertical section taken approximately along the line 4—4 of FIG. 3.

DESCRIPTION OF THE PREFERRED EMBODIMENTS

One embodiment of a truck made according to the invention is illustrated in FIGS. 1 and 2 and is seen to include an elongated truck frame 10 which may be in the form of a tube. At one end of the truck frame 10, a track drive sprocket 12 is journalled by any suitable conventional means while at the opposite end, an idler sprocket 14 is also journalled. Preferably, the sprocket 14 is a recoil idler as is well known in the art and, accordingly, suitable, conventional recoil means 16 are provided to accommodate limited recoiling of the idler 14 on slide bearings 18.

A conventional endless track 20 is trained about the sprockets 12 and 14 as well as the frame 10. The upper run of the track 20 is supported between the sprockets 12 and 14 by upwardly directed carrier rollers 22 which are secured in any suitable conventional fashion to the frame 10. The frame 10 also mounts, in downwardly extending relation, a plurality of conventional track roller assemblies, each generally designated 24. More specifically, each track roller assembly is secured to the frame 10 by resilient means, generally designated 26, which cushion movement of an associated track roller assembly 24 in the vertical direction. In a preferred embodiment, the resilient means 26 for each track roller assembly 24 comprises a pair of resilient cushions 28 which flank the roller 30 of each track roller assembly 20 as best seen in FIG. 2.

It will be realized from the discussion thus far, that if no more than the just described structure were employed, the track roller assemblies 24 would be free to move longitudinally, i.e., along the upper surface of the lower run of the track 20. Such movement would occur for any of a variety of reasons including the flexing of the track 20 when traveling over rough terrain, the inherent rolling resistance of the rollers 30 of each track roller assembly, etc. This, in turn, would cause the resilient means 26 to be stressed in a non-vertical direction resulting in its wearing out prematurely.

In the past, this problem has been solved by the use of additional resilient means for cushioning movement of the track roller assemblies 24 in a longitudinal direction as, for example, the use of obliquely disposed cushions as illustrated in the previously identified Alexander et al patent. This solution is quite adequate but the necessity of additional pads as well as the provision of the obliquely located supporting brackets for the pads increases the expense of the suspension system.

According to one embodiment of the present invention, longitudinal restraint is accomplished through a linkage system, generally designated 32. More specifically, links 34, 36, 38, 40 and 42 are employed to interconnect the six track roller assemblies 24 illustrated. The links 36, 38, and 40 are all flat links and are pivotally secured to intermediate ones of the track roller assemblies 24 by any suitable means coincidentally with the axis of rotation of the roller 30 in each assembly 24.

The links 34 and 42 are provided with an offset 44 so as to allow the connection of a bell crank 46 exteriorly of one end of the link to the corresponding endmost one of the track roller assemblies 24. Each bell crank 46 has one end pivotally connected to the corresponding track roller assembly 24, also coincidentally with the axis of rotation of the roller 30 thereof, and, by means of a pivot 48 intermediate its ends, is connected to the frame 10 and, specifically, a depending side member 50 thereof.

The opposite end of each bell crank is free and depends from the pivot 48 into side-by-side relationship with either the link 36 or the link 40, as the case may be. As a result, the end of the bell crank adjacent such link serves to restrain the link, and thus the track roller assemblies 24, against side-to-side movement thereby obviating any need for cushioning pads to provide such restraint.

It will also be observed from FIG. 2 that the depending side members 50 of the track frame 10 engage portions of the links 34, 38 and 44 as well as the bell cranks 46 and thereby provide a further restraint against side-to-side movement of the track roller assemblies 24.

A further embodiment of the invention is illustrated in FIGS. 3 and 4, and to the extent that the same contains many elements identical to those described previously in connection with the embodiment illustrated in FIGS. 1 and 2, they will not be described further herein, it merely being noted that they bear the same reference numerals.

In the embodiment illustrated in FIG. 3, a means for providing the restraint against longitudinal movement of the track roller assemblies 24 is generally designated 60, and is seen to comprise a cable consisting of a cable section 62 and a cable section 64. Adjacent ends of the cable sections 62 and 64 are resiliently connected to each other as by means of a spring 66 while the opposite ends are connected to the frame 10 and, specifically, the depending side walls 50 by any suitable brackets 52.

The cables 62 and 64 extend through bores in the track roller assemblies 24 and are secured to the track roller assemblies 24 as by bolts schematically illustrated at 68 which are tapped in suitable bores in the track roller assemblies 24 intersecting the bores through which the cables 62 extend to provide a clamping force.

In the embodiment illustrated in FIGS. 3 and 4, restraint against side-to-side movement is provided by the depending side members 50 which are in side-by-side relationship with opposite ends of each track roller assembly 24 to engage the same. Preferably, wear plates 70 in the lower extremity of each depending side member 50 are employed for this purpose.

From the foregoing, it will be appreciated that the second embodiment of the invention, like the first, eliminates the need for many cushioning pads employed to restrain longitudinal and side-to-side movement in prior art assemblies and, accordingly, can be manufactured much more economically. Longitudinal and side-by-side restraint is provided in both embodiments of the invention so as to maximize the life of the cushioning pads 28 thereby providing for a long-lived truck. Moreover, through the use of means of the character shown, this result is obtained at a much more economical cost than previously.

We claim:

1. A truck for a track type tractor comprising:
   an elongated truck frame;
   a pair of track sprockets, one journalled on said frame at each end thereof;
   an endless track trained about said sprockets and said truck frame;
   a plurality of track roller assemblies engaging the upper surface of the lower run of said track at longitudinally spaced points between said sprockets;
   a plurality of resilient means, one for each track roller assembly, interconnecting the associated track roller assembly and said frame for cushioning, in a vertical direction, movement of said track roller assemblies; and
   non-resilient means interconnecting said track roller assemblies and said frame for firmly restraining said track roller assemblies against longitudinal movement relative to said frame while allowing movement of said track roller assemblies relative to said frame in a vertical direction, said restraining means being elongated in the direction of elongation of said frame.

2. A truck according to claim 1 wherein said restraining means comprises two cable sections secured to each other at adjacent ends by resilient means, at opposite ends to said truck frame and intermediate their ends to said track roller assemblies.

3. A truck according to claim 2 wherein said truck frame includes depending side members extending downwardly into side-by-side relation with said track roller assemblies to restrain said track roller assemblies against side-to-side movement relative to said main frame.

4. A truck according to claim 1 further including means for restraining said track roller assemblies against side-to-side movement relative to said frame including downwardly extending side members on said frame, said side members depending into side-by-side relationship with said track roller assemblies.

5. A truck according to claim 1 wherein said restraining means comprise linkage means.

6. The truck of claim 5 wherein said linkage means comprise a cable attached to said frame and to said track roller assemblies.

7. The truck of claim 5 wherein said linkage means comprise a plurality of individual links pivotally connected to each other and to said track roller assemblies.

8. A truck according to claim 7 wherein at least one of said links is a bell crank having one end connected to one of another of said links and one of said track roller assemblies and an opposite end disposed in side-by-side relation with another of said links to restrain said other link against side-to-side movement to thereby restrain side-to-side movement of said track roller assemblies.

9. A truck according to claim 8 wherein said truck frame includes depending side members extending downwardly into side-by-side relation with said links to further restrain the same against side-to-side movement.

* * * * *